Feb. 1, 1944.  C. F. BEED  2,340,505
AEROFOIL TESTING APPARATUS
Filed Jan. 29, 1940
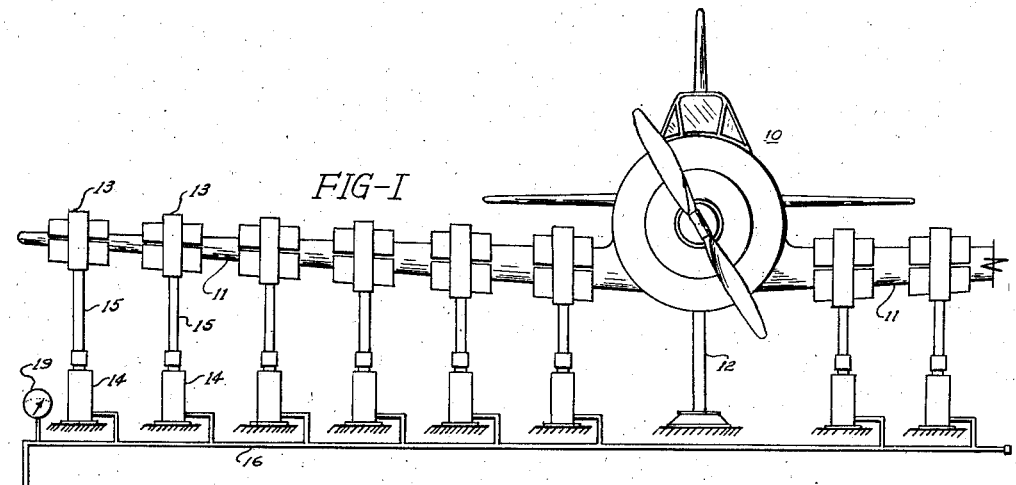
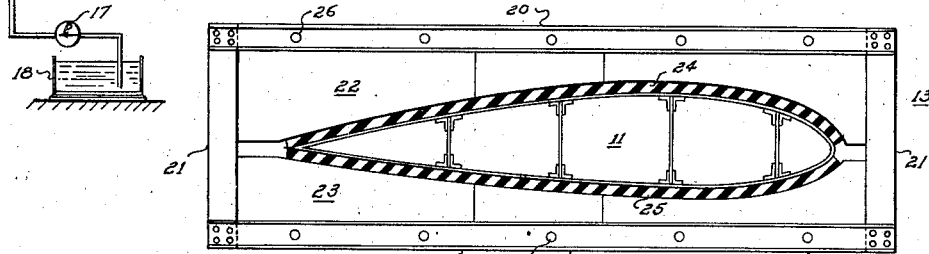
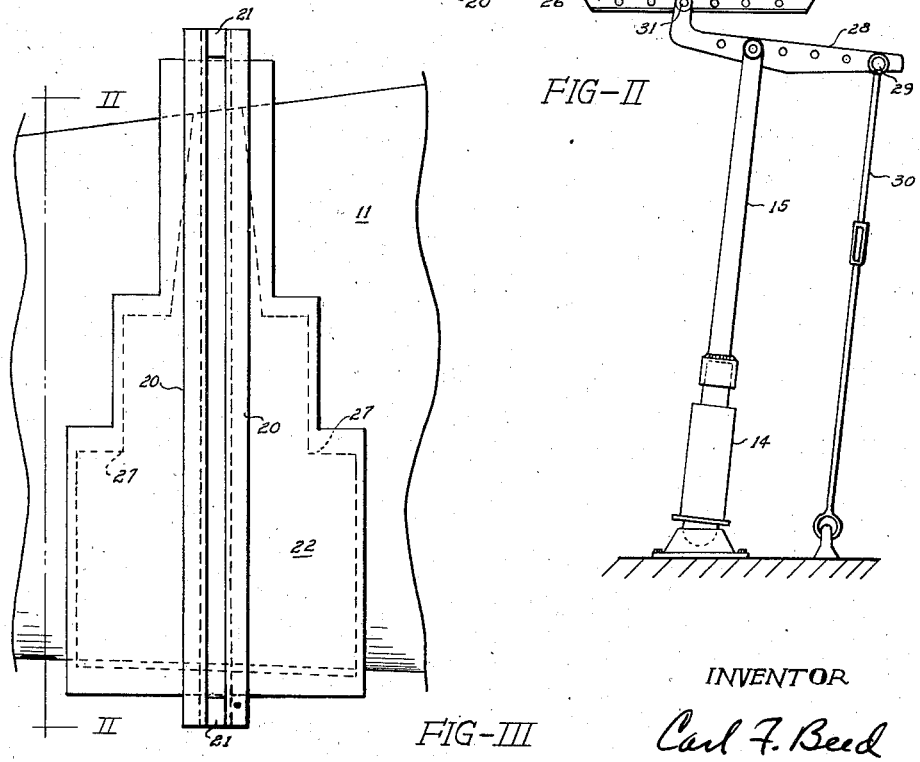
INVENTOR
Carl F. Beed Patented Feb. 1, 1944

2,340,505

UNITED STATES PATENT OFFICE 2,340,505

AIRFOIL TESTING APPARATUS

Carl F. Beed, Burbank, Calif., assignor to Lockheed Aircraft Corporation, Burbank, Calif.

Application January 29, 1940, Serial No. 316,173

6 Claims. (Cl. 73—51)

This invention relates to testing apparatus and more particularly to an apparatus adapted to apply test loads to built-up hollow structures such as aircraft wing elements and the like.

The apparatus of my invention has been found to be especially useful in load testing aircraft wing elements which, in order to more nearly simulate actual flight conditions, require the load to be proportioned to both the upper and lower surfaces thereof and also distributed in a chord-wise direction. Heretofore, it has been common practice to apply such loads by means of sand bags or lead weights, which methods are undesirable not only because of the number of weights involved and the time required for testing, but also because of the fact that such practice imposes a considerable handicap on the structure. Furthermore, when complete aircraft are load tested by means of these obsolete methods, it is necessary that they be inverted in order that the load will act in the right direction. In experimental work relative to the development of my invention I have found that aircraft structures originally load tested by the older methods as referred to above, vary considerably in their ability to support the loads for which they were designed, which clearly indicates that such structures were inefficient in design and in many cases probably unsafe at the loads under which they operated.

It is, therefore, among the objects of this invention; to provide an apparatus for load testing built-up hollow structures, and particularly structures such as aircraft wing elements, whereby the actual loading conditions, to which said structures will be subjected in service, can be closely approximated; to provide an apparatus capable of distributing the load in any desired manner; to provide apparatus for testing structures of large size whereby the entire structure may be simultaneously loaded; to shorten the time for testing such structures; to provide an apparatus which, when used for testing aircraft wing elements, will impose a resultant load rather than merely a lift load; to provide a test set-up which will satisfy all flight conditions; to improve testing methods and apparatus generally; and many other objects and advantages as will become more apparent as the description proceeds.

In the accompanying drawing forming a part of this description;

Figure I diagrammatically illustrates the manner in which my invention would be used in load testing the wings of a complete airplane;

Figure II is an enlarged view as indicated by the line II—II of Figure III and showing in detail the apparatus for applying the load to the wing element;

Figure III is a top view of Figure II and illustrates the apparatus which I have provided for varying the load in a chord-wise direction.

In Figure I, I have diagrammatically illustrated the manner in which my invention is used to apply a test load to the wings of a completed airplane. In the embodiment shown, the airplane 10 having wings 11 is supported in a substantially horizontal attitude by means of anchor members such as indicated at 12. It has been found that two such anchor members 12, one located near the center of pressure of the test load and the other at the tail of the airplane, are usually sufficient for test set-ups of this type.

The test load is applied to the wings 11 by means of a plurality of rigid loading frames 13, as will be hereinafter described, spaced at relatively close intervals along said wing 11. The test load is preferably applied to the frames 13 by means of a plurality of hydraulic jacks 14 and interconnecting members 15, said hydraulic jacks 14 being operated from a common fluid pressure line 16 in which the desired operating pressure is maintained by means of the pump 17. The reservoir 18 and a suitable pressure indicating means 19 are the remaining elements essential to a satisfactory hydraulic loading system. However, it will be understood that while I prefer to apply the load to the frames 13 by hydraulic means, I do not intend to limit my invention to such arrangement and that any other means capable of exerting the desired force can be readily employed for this purpose.

Referring to Figure II, which clearly illustrates the details of my loading apparatus, the rigid frame 13 is comprised of horizontal and vertical members 20 and 21, upper and lower loading blocks 22 and 23, and layers of resilient material 24 and 25. Since the loading blocks 22 and 23 are shaped to substantially conform to the contours of the upper and lower surfaces of the test specimen, in this case the wing 11, I prefer to construct them of wood and secure them to the horizontal members 20 by means of bolts 26. Thus, said blocks 22 and 23 may be easily removed and another pair of different shape readily substituted therefor. The interposed layers of resilient material 24 and 25 are preferably of sponge rubber, and are secured to both the upper and lower surfaces of the wing 11 and to the blocks 22 and 23 by means of a suitable adhesive, in this way allowing the upper layer of resilient material 24 to transfer the load in tension and the lower layer of resilient material 25 to transfer the load in compression. Thus, any load applied to the frame 13 is transferred to the wing 11 and distributed to both the upper and lower surfaces thereof, substantially in proportion to the area of the layers of resilient material 24 and 25. However, it is to be understood that such distribution of load may be accomplished by means of a variable thickness of rubber instead of or in combination with variable area.

As another feature of my loading apparatus I have provided a novel mechanism for applying the load to the rigid frames 13 and by which I vary both the magnitude and direction of the load. This mechanism consists of a lever 28, pivotally supported at 29 by means of the tension member 30, and pivotally attached to the loading frame 13 as indicated at 31. The test load is applied to the lever 28 at a point intermediate its ends by means of the hydraulic jack 14 and the interconnecting member 15, pivotally attached thereto. Thus, the direction of the test load is controlled by varying the angle of the jack 14 relative to the wing 11, while the magnitude is controlled by varying the point along the lever 28 at which the force is applied. This mechanism is particularly useful in connection with the set-up shown in Figure I which usually requires a distribution of the load along the wing. It will also be understood that, while the mechanism can be set up to apply either tension or compression loads, by transposing the jack and tension members; as illustrated it is arranged to exert an upward force on the wing 11.

It will be readily appreciated that the embodiment shown is designed for load testing aircraft structures but that same can be advantageously applied to many other types of structures. I, therefore, desire to emphasize the fact that all such modifications may be resorted to in a manner limited only by a just interpretation of the appended claims.

I claim:

1. An apparatus for approximately flying loads during the static testing of airfoils, comprising a series of rigid stress applying structures transversely enveloping and conforming to said airfoil at intervals corresponding to the stress distribution thereover, resilient material bonded to said structures and to the surfaces of said airfoil, said material being substantially continuous between said surfaces and said structures and adapted to transmit forces to and from the surfaces of said airfoil, means for anchoring said airfoil, and means for applying a single load variable in both direction and amount to each structure whereby tension and compression loads are applied simultaneously to the opposite surfaces of said airfoil.

2. An airfoil load applying apparatus comprising a set of rigid stress applying structures for transversely embracing said airfoil, contour members secured in each of said structures for bodily movement therewith and in spaced relationship to the surfaces of said airfoil, resilient material disposed in the spaces therebetween and bonded to both the airfoil surface and the contour members, and means for applying a load variable in amount and direction to said structures whereby to transmit tensile and compressive forces from the structures to the opposite surfaces of the airfoil.

3. An airfoil load applying apparatus comprising a set of spaced rigid stress applying structures for transversely embracing said airfoil, contour members secured in each of said structures for bodily movement therewith and in spaced relationship to the surfaces of said airfoil, said contour members varying in width in approximate proportion to the distribution of the surface loading of said airfoil, and resilient materials disposed in the spaces between said contour members and the airfoil and bonded therebetween, and means for simultaneously loading said structures whereby to cause transmission of tensile and compressive forces from said structures to said airfoil surfaces according to the direction of the applied force and in proportion to the load distribution thereover.

4. Apparatus for applying test loads to an airfoil section, comprising, at least one rigid stress applying structure having an opening therein for receiving said section, said opening generally conforming in shape to said section and being of sufficient size to provide a space surrounding said section between said structure and said section, resilient material positioned in said space on opposite sides of said section and bonded to both said structure and said section for transmitting tension and compression stresses between said structure and said section, and means for applying a load to said structure to cause said structure to move as a body and apply tension stresses to portions of said section and compression stresses to other portions of said section.

5. Apparatus for applying test loads to an airfoil section, comprising, at least one rigid frame surrounding said section, blocks rigidly secured to the interior of said frame to form a rigid stress applying structure and defining an opening receiving said section, said opening generally conforming in shape to said section and being of sufficient size to provide a space surrounding said section between said blocks and said section, resilient material positioned in said space on opposite sides of said section and bonded to both said blocks and said section for transmitting tension and compression stresses between said structure and said section and means for applying a load to said structure to cause said structure to move as a body and apply tension stresses to portions of said section and compression stresses to other portions of said section.

6. Apparatus for applying test loads to an airfoil section, comprising, at least one rigid stress applying structure having an opening therein for receiving said section, said opening generally conforming in shape to said section and being of sufficient size to provide a space surrounding said section between said structure and said section, resilient material positioned in said space on opposite sides of said section and bonded to both said structure and said section for transmitting tension and compression stresses between said structure and said section, and means for applying a load to said structure to cause said structure to move as a body and apply tension stresses to portions of said section and compression stresses to other portions of said section, portions of said structure and resilient material being of greater width than other portions thereof in order to provide a desired distribution of said stresses to said section.

CARL F. BEED.